June 18, 1935.  C. DE L. RICE  2,005,165
RAILWAY CAR BODY
Filed Jan. 18, 1934    4 Sheets-Sheet 2
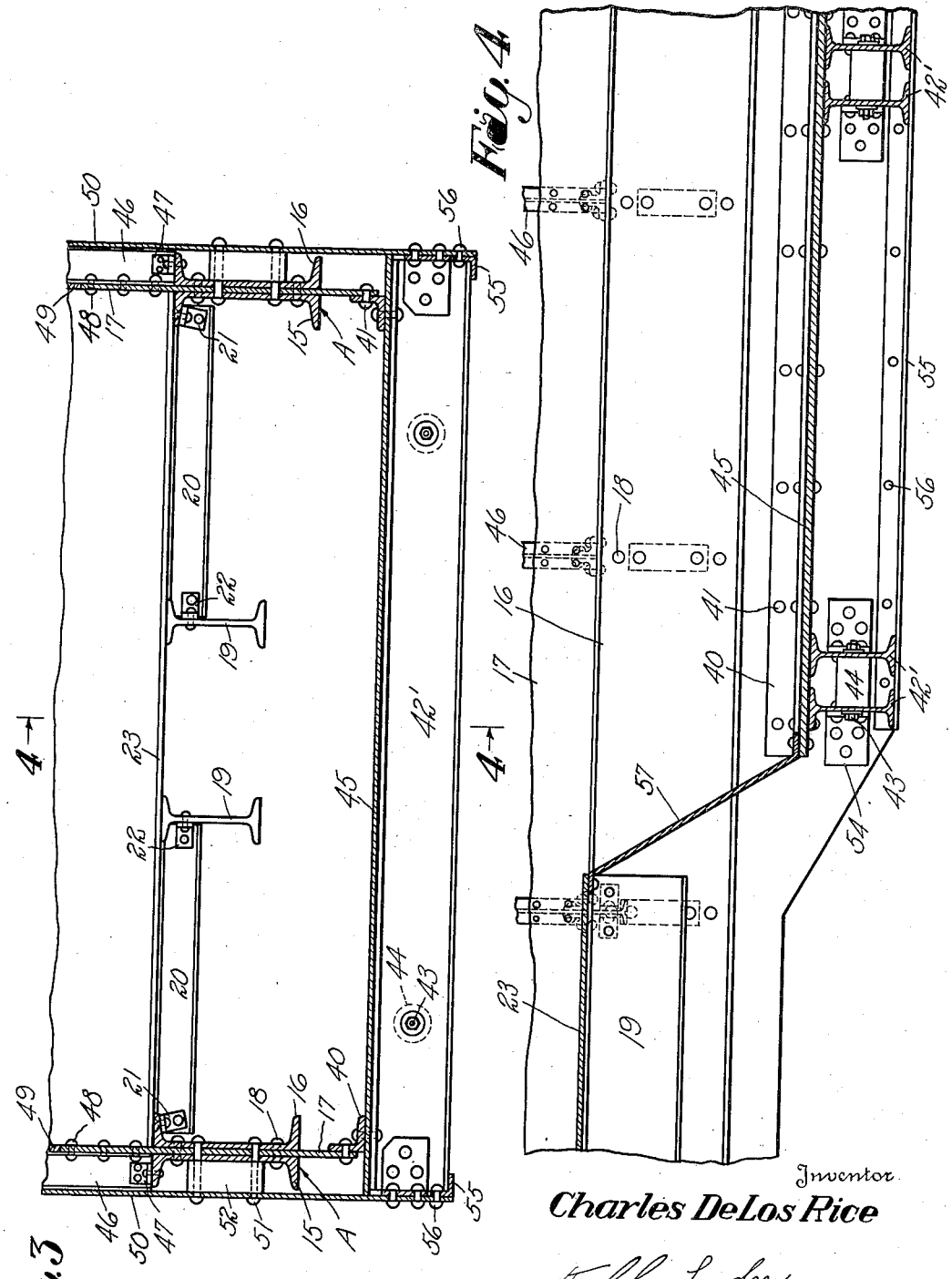
Inventor
*Charles DeLos Rice*
By *H. Clay Lindsey,*
Attorney

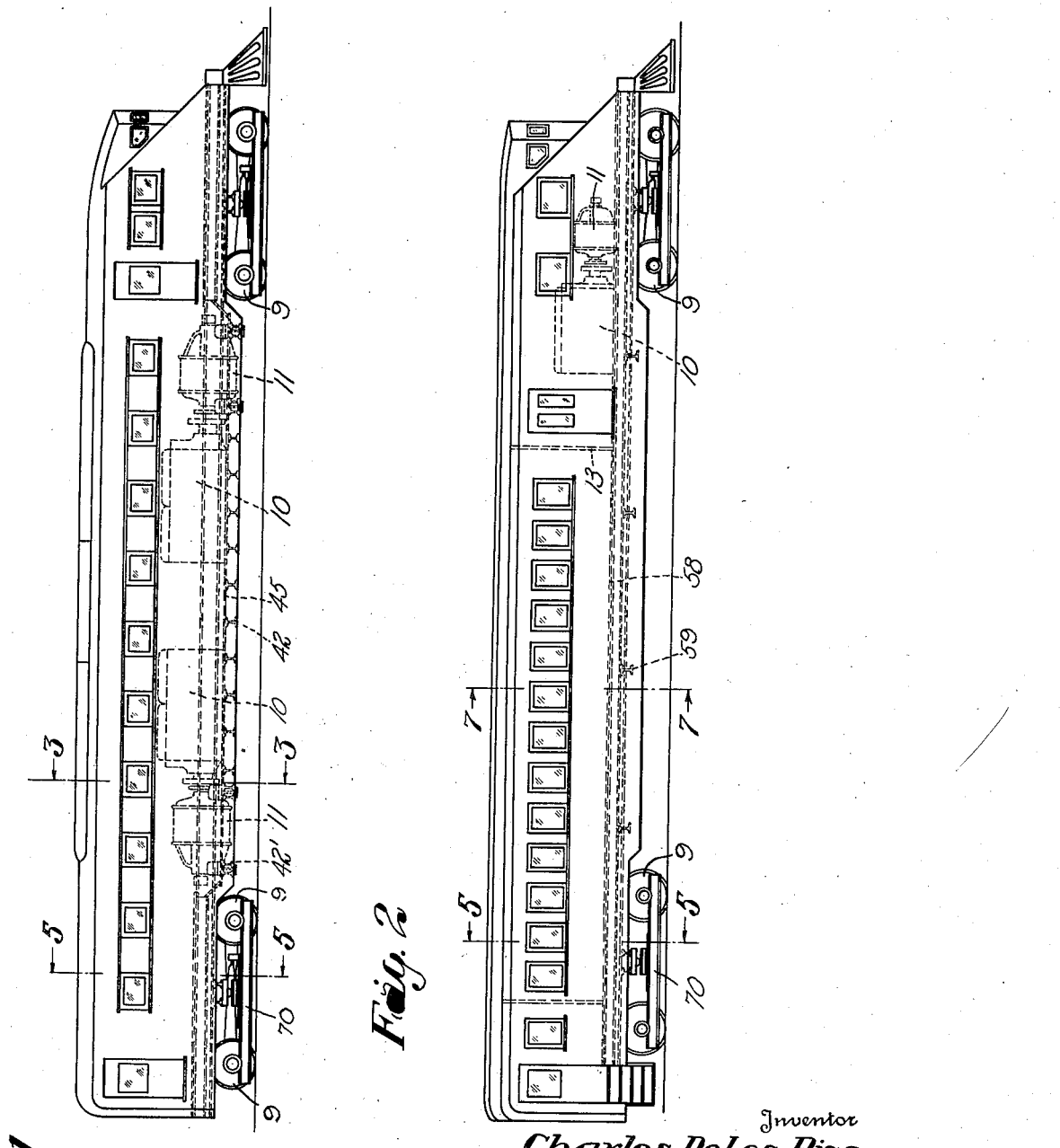

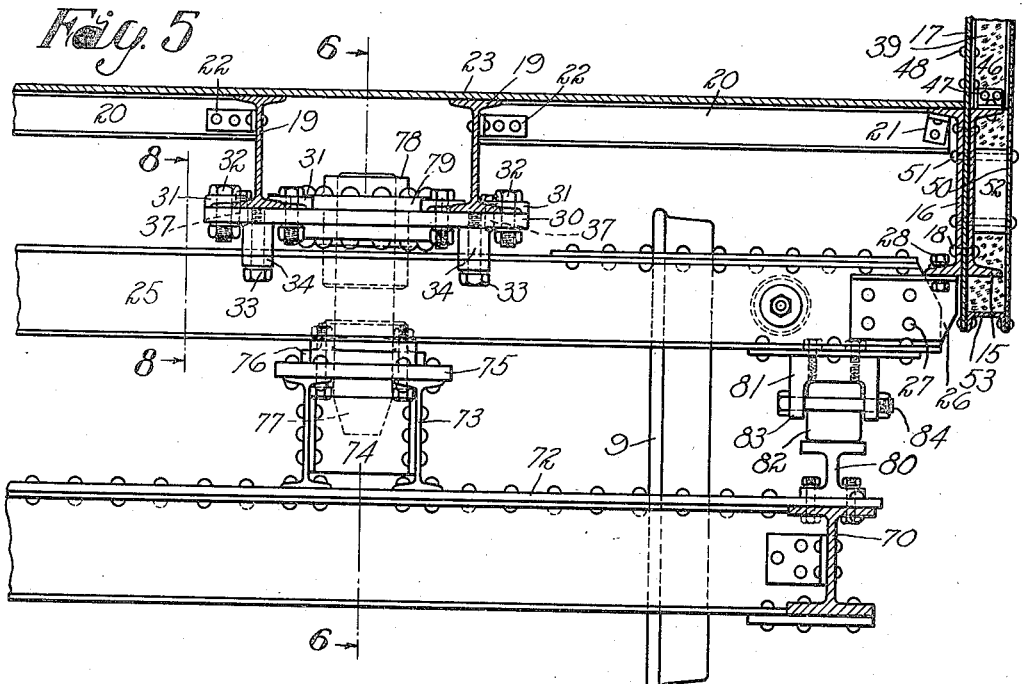
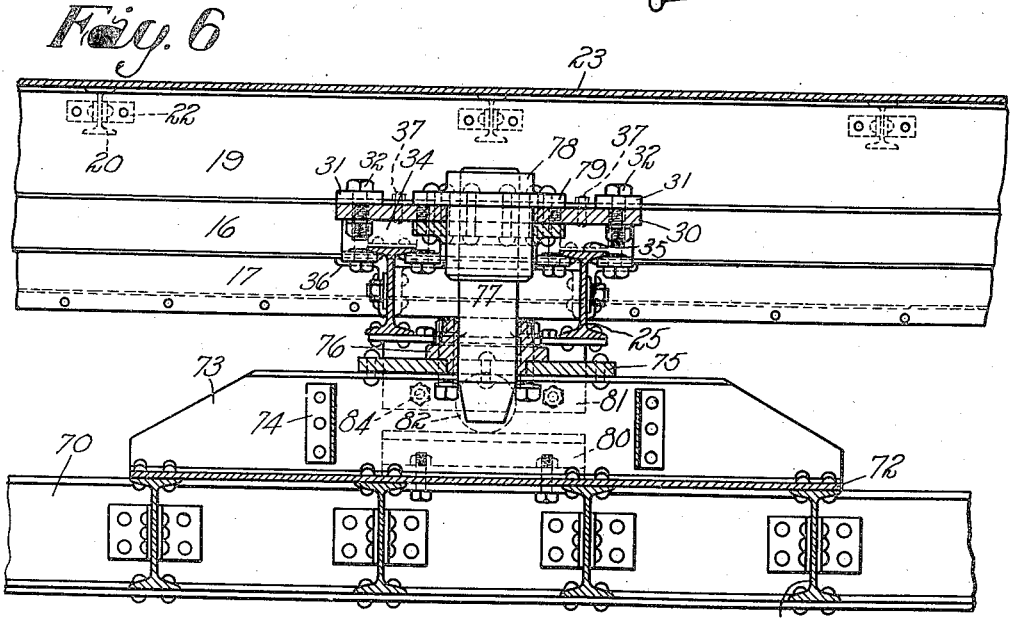

June 18, 1935. C. DE L. RICE 2,005,165
RAILWAY CAR BODY
Filed Jan. 18, 1934 4 Sheets-Sheet 4
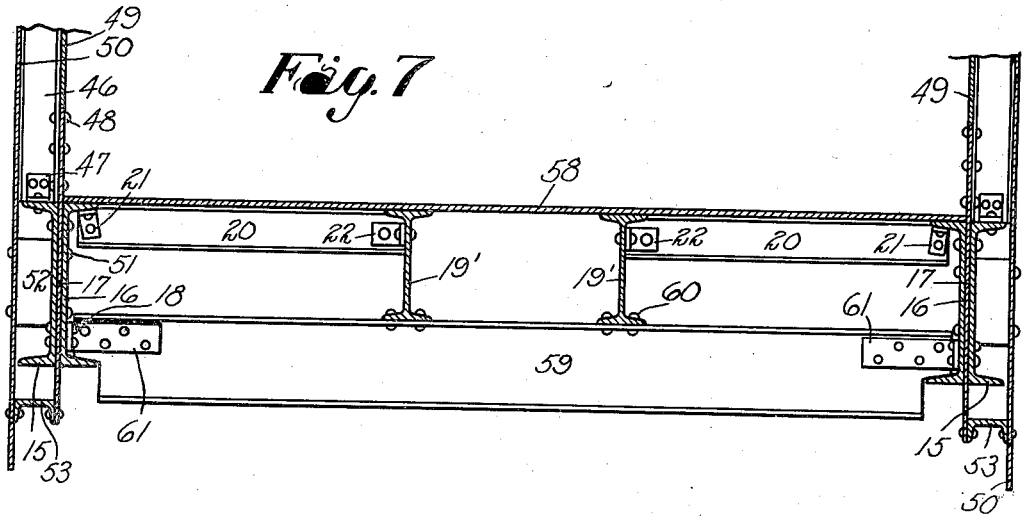
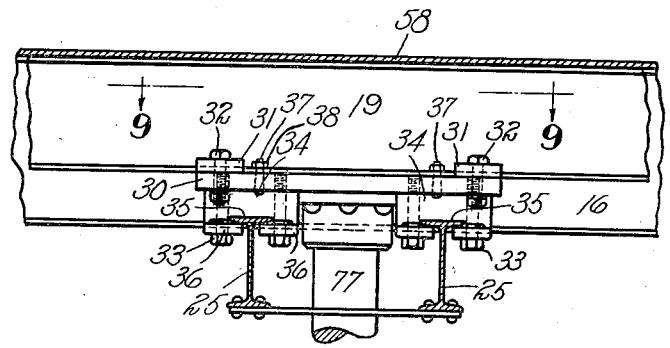
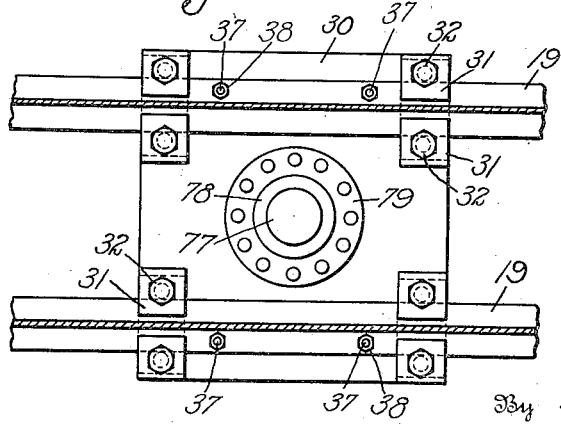
Inventor
Charles DeLos Rice
By
Attorney Patented June 18, 1935

2,005,165

UNITED STATES PATENT OFFICE 2,005,165

RAILWAY CAR BODY

Charles De Los Rice, West Hartford, Conn.

Application January 18, 1934, Serial No. 707,199

6 Claims. (Cl. 105—413)

This invention relates to railway cars, and has particular reference to the construction of the frame and body thereof. The features of the present invention find particular adaptability in locomotive cars of the type which carries an electric generator and means for driving the same such, for example, as a Diesel engine. The improvements will, therefore, be described in that connection, it being understood, however, that such disclosure is by way of illustration and not by way of limitation.

The object of the invention is to provide a car having various features of novelty and advantage and which is characterized by its simplicity in construction, its lightness in weight, and its strength, rigidity, and durability.

A further aim of the invention is to provide an improved arrangement of car wherein the electric generating power plant or plants carried thereby may be positioned relatively low so as to lower the center of gravity and to make the roof line lower than exists with regular passenger trains of today.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein the various features are illustrated.

Fig. 1 is a side view of a car equipped with two generators;

Fig. 2 is a similar view showing another embodiment of the invention, the car being of the combination locomotive and passenger or freight carrying type;

Fig. 3 is a transverse sectional view through the car body shown in Fig. 1, this view being taken substantially on line 3—3 of that figure, the power plant being omitted;

Fig. 4 is a longitudinal sectional view taken on line 4—4 of Fig. 3;

Fig. 5 is a transverse sectional view taken substantially on line 5—5 of Fig. 1 and Fig. 2;

Fig. 6 is a longitudinal sectional view taken substantially on line 6—6 of Fig. 5.

Fig. 7 is a transverse sectional view taken on line 7—7 of Fig. 2;

Fig. 8 is a detail view taken substantially on line 8—8 of Fig. 5; and

Fig. 9 is a detail view taken substantially on line 9—9 of Fig. 8.

Referring to the drawings in detail, in Fig. 1 is illustrated an electric locomotive having two power plants each of which may include a driving unit 10 and the electric generator 11. The driving units are preferably in the form of Diesel engines. These units are preferably positioned in reverse relation on the longitudinal central line of the car. The axles (on which the wheels 9 of the locomotive are fixed) are associated with suitable motors electrically connected with the generators, the motors not being shown as they form no part of the present invention. In the embodiment of Fig. 1, the power plants are positioned between the truck ends of the car, and the central portion of the platform or floor of the car is of a lower level than those portions of the platform which are above the trucks, this arrangement being provided in order to lower the center of gravity and to eliminate the necessity of raising the roof of the car. In Fig. 2 is disclosed a combined locomotive and passenger car. In this case, the floor of the platform is of a uniform level throughout its length and the power plant, including the Diesel engine 10 and the generator 11, is located in a compartment over the front truck. The engine compartment at the forward end of the car is separated from the passenger compartment by a transverse partition 13.

Reference will first be had to the construction of the car body shown in Fig. 1. The car body has two side sills, designated by the letter A, which extend from one end of the car body to the other. Each of these side sills includes a pair of channel irons 15 and 16 positioned back to back and an interposed metal plate 17 extending above and below the top and bottom flanges of the channel irons. The channel irons 15 and 16 and the interposed plate 17 are secured together by rivets 18. At each end of the car body is a pair of longitudinally extending I-beams 19, the I-beams of each pair being positioned somewhat to opposite sides of the longitudinal central line of the car. The upper surfaces of these I-beams are in the plane of the top surfaces of the channel irons 16. These I-beams 19 are only slightly longer than the trucks over which they are positioned. The I-beams are secured in proper spaced relation to the side sills by means of transversely positioned I-beams 20 which are connected at one end to the channel iron 16 by angled plates or brackets 21 and at the other end to an I-beam 19 by brackets 22. The floors 23 at the ends of the car over the trucks are supported, as shown most clearly in Fig. 5, upon the upper surfaces provided by the channel irons 16, the longitudinally extending I-beams 19, and the cross beams 20. Adjacent each end of the car and positioned substantially midway between the ends of the I-beams 19 and to opposite sides of the center pivot of the truck are a pair of transverse I-beams 25. These I-beams 25 are positioned transversely below the I-beams 19, and they are connected at their opposite ends to the lower flanges of the channel irons 16 by right-angled joint plates 26, there being two such plates at each end of an I-beam 25. These joint plates are secured to opposite sides of the vertical web of the I-beam by rivets 27, and the horizontal flanges of the joint plates are secured against the underside of the channel iron 16 by bolts 28.

The longitudinally extending I-beams 19 are connected to the intermediate portions of the transverse I-beams 25, as shown most clearly in Figs. 5, 6, and 8. Referring to these figures, 30 is a rectangular anchor plate underlying and engaging the bottom surfaces of the I-beams 19 and secured to the lower flanges thereof by dogs or clips 31. Each of these clips has a fulcrumed end resting upon the plate and an end overlying a flange of the I-beam. The clips are secured in place by means of bolts 32. Secured to the underside of the anchor plate 30, as by means of screws 33, are seat blocks 34 recessed, as at 35, so as to receive and accommodate the upper edges of the I-beams 25. The flanges of the I-beams 25 are secured in these notches or recesses by clips 36 similar to the clips 31. These clips 36 are clamped against the flanges of the I-beams by tightening up the bolts 33. It will thus be seen that the anchor plate 30 is secured to the longitudinally extending I-beams 19 by the clips or dogs 31, and the transverse I-beams 25 are secured to that plate by the blocks 34 and the dogs 36 so that the two sets of I-beams are secured together. The anchor plate is secured against creeping movement with respect to the I-beams 19 by tapered dowel pins 37. These pins extend through the plate 30 and the lower flanges of the I-beams. They are drawn home and secured by nuts 38. As will be hereinafter described more in detail, the pivot pin for the truck is secured to this plate 30.

The intermediate portion of the car floor, in the embodiment shown in Fig. 1, is supported, as most clearly shown in Figs. 3 and 4, at a level below that of the end platforms. As previously stated, the intermediate portion of the platform is adapted to support the power plants and is brought to a lower level in order to lower the center of gravity and in order to lower the roof of the car below the usual level. Referring to Figs. 3 and 4 more specifically, it will be observed that an angle iron 40 is secured to each of the lower edges of the depending portions of the interposed plates 17 of the sills. These angle irons are secured to the plates 17 by rivets 41. Secured, as by rivets, to the horizontally extending flanges of the angle irons are a plurality of transverse I-beams 42 which in the present instance are eighteen in number, it being understood, of course, that the number may be changed to suit requirements. The I-beams 42' which support the generators are preferably arranged in pairs as illustrated, the I-beams 42' of each pair being secured together by bolts 43 which pass through spacing tubes 44 interposed between the vertical webs of the I-beams. The intermediate floor 45 is supported on the top of the I-beams 42 and is preferably interposed between those I-beams and the channel irons 40.

The side framings of the car comprise vertical I-beams 46 the lower ends of which rest upon the top flanges of the outer channel irons 15 of the sills. The lower ends of these I-beams are connected to those flanges by brackets 47. The inner flanges of the I-beams 46 are secured to the upwardly projecting portions of the intermediate plates 17 of the sills, as by means of rivets 48. On the inside of the vertical struts or I-beams 46 is a lining 49 which may extend upwardly to the roof of the car. The numeral 50 designates the sheathing or outside wall of the car body. This sheathing at the ends of the car terminates at its lower edge coincidentally with the lower edge of the interposed plate 17. The sheathing is secured to the vertical webs of the sills by rivets 51, and preferably spacing blocks 52 are interposed between the sills and the sheathing. The space between the lower edges of the interposed plates and the sheathing is enclosed by an inverted angle iron 53, which may be riveted in place. The space above the angle iron 53 and between the sheathing on the outside, and the side sill and lining on the inside, may be filled with a heat insulating material 39, such as ground cork (see Fig. 5). The channel irons prevent the insulating material from falling out.

As shown in Figs. 3 and 4, the sheathing 50, between the raised end platforms, has its lower edge extending slightly below the transverse I-beams 42. The ends of these I-beams are attached to the sheathing by brackets 54. Secured to the lower edge of the sheathing is an angle iron 55 having its horizontal web extending inwardly. The ends of the I-beams 42 rest upon this flange. The angle iron is secured to the sheathing in any suitable way, as by means of rivets 56. It will be observed that, with the arrangement described, the I-beams constituting the central portion of the platform, are suspended from the intermediate plates 17 of the sills by the angle irons 40, and the I-beams 42 are connected to and supported in part by the sheathing 50, thus forming a rigid, durable construction in which the parts are securely held together. As shown most clearly in Fig. 4, the spaces between the ends of the intermediate floor 45 and the adjacent ends of the raised floors 23 are closed by sheet metal riser plates 57.

In the embodiment shown in Figs. 1 to 4, inclusive, the intermediate floor of lower level is disclosed, for illustrative purposes only, as extending substantially the full distance between the trucks. It is, of course, understood that the dropped floor may be of lesser length; for example, it may extend from the front truck back half way of the car length. In this case, one power plant unit may be supported by the dropped floor, and the rearward half of the car may be used for mail or express, or both.

In the embodiment shown in Fig. 2, the floor 58 is of the same level throughout its length, as previously stated. In this case, the construction of the platform at each end of the car is similar to that shown in Figs. 5 and 6. However, the centrally located I-beams 19' extend from one end of the car to the other. At spaced intervals throughout the length of the car are transverse I-beams 59 the upper flanges of which are secured to the lower flanges of the I-beams 19', as by means of rivets 60. The ends of the cross beams 59 are secured to the lower flanges of the channel irons 16 by means of joint brackets 61.

In Figs. 5 and 6, portions of the trucks are shown. It is understood, of course, that the trucks may be of any suitable construction, that shown in the drawings being by way of illustration only. In the present instance, each truck has a frame comprising a pair of longitudinally extending bolsters in the form of H-beams 70 which are tied together by transverse I-beams. The transverse I-beams are connected together by a top plate 72, the latter being riveted to the upper flanges of the I-beams. On top of the plate are a pair of spaced apart longitudinally extending beams 73 connected by braces 74. The beams 73 support a plate 75 to which is secured a bearing member 76 in which the lower end of the truck pivot pin 77 is journaled. This pin is fixed to and extends through a sleeve 78 having a flange 79 which rests on top of and is secured to the afore-described anchor plate 30.

The side bearings between the truck and the car body may be of any suitable construction, each of them here being shown as comprising a bearing member 80 in the form of a short H-beam secured to and extending longitudinally of a bolster 70; a top bearing member 81 secured to the undersides of the I-beams 25; and an interposed roller 82. The member 81 has at each side a depending flange 83 so as to prevent axial displacement of the roller. Adjacent each end of the member 81 is a bolt 84, and these bolts constitute end stops for preventing the roller from rolling off of the bottom bearing member 80.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a railway car, a car body having a pair of side sills extending throughout the length of the car, a floor at each end of the car above the trucks and supported by said sills at an upper level, a sheathing at each side of the car and extending downwardly below said sills between said end floors, transverse beams between the end floors and extending beneath said sills from one sheathing to the other sheathing, means for connecting said transverse beams to said sills, means for connecting the ends of said transverse beams to said sheathings, and a floor supported by said transverse beams located below the level of the end floors.

2. In a railway car, a car body having a pair of side sills each comprising a pair of channel irons positioned back to back and an interposed plate between the channel irons and extending above and below the channel irons, vertical beams resting on the upper horizontal flanges of the outer channel irons and having their inner webs secured to said plates, longitudinally extending beams between said channel irons and having their upper surfaces level with the upper surfaces of said channel irons, a floor supported on the inner channel irons and said longitudinally extending beams, and transverse beams below said longitudinally extending beams and having their ends connected to said side sills.

3. In a railway car, a car body having a pair of side sills each comprising a pair of channel irons positioned back to back and an interposed plate between the channel irons and extending above and below the channel irons, vertical beams resting on the upper horizontal flanges of the outer channel irons and having their inner webs secured to said plates, longitudinally extending beams between said channel irons and having their upper surfaces level with the upper surfaces of said channel irons, a floor supported on the inner channel irons and said longitudinally extending beams, transverse beams below said longitudinally extending beams and supporting the latter, and means for connecting the ends of said transverse beams to said sills.

4. In a railway car, a car body having a pair of side sills each comprising a pair of channel irons positioned back to back and an interposed plate between the channel irons and extending below the same, a floor at each end of the car above the trucks and supported upon the upper edges of the inner channel irons, transverse beams between the end floors and extending beneath said sills, a floor supported on said transverse beams and located at a level below said end floors, and channel irons connecting said beams to the depending portions of said plates.

5. In a railway car, a car body having a pair of side sills each comprising a pair of channel irons positioned back to back and an interposed plate between the channel irons and extending above and below the same, vertical beams resting upon the upper flanges of the outer channel irons and having their inner webs secured to the upwardly extending portions of said interposed plates, a floor at each end of the car and supported upon the inner channel irons, a sheathing on each side of the car extending between said end floors below the lower edges of said interposed plates, transverse beams between said end floors extending below said sills and from one sheathing to the other, angle irons for connecting said transverse beams to the lower edges of the depending portions of said interposed plates, and means for connecting the ends of said transverse beams to said sheathings.

6. In a railway car, a car body having a pair of side sills each comprising a pair of channel irons positioned back to back and an interposed plate between the channel irons and extending above and below the same, vertical beams resting upon the outer channel irons, a lining on the inside of said vertical beams, a sheathing on each side of the car and extending down below said channel irons, an inverted channel in the space between the lower edge of said interposed plate and said sheathing, and an insulating material in the space between said lining and sheathing and above said inverted channel iron.

CHARLES DE LOS RICE.